(12) United States Patent
Haddadin

(10) Patent No.: US 11,396,098 B2
(45) Date of Patent: Jul. 26, 2022

(54) CONTROL OF A ROBOT SYSTEM

(71) Applicant: Franka Emika GmbH, Munich (DE)

(72) Inventor: Sami Haddadin, Hannover (DE)

(73) Assignee: Franka Emika GmbH, Munich (DE)

( * ) Notice: Subject to any disclaimer, the term of this patent is extended or adjusted under 35 U.S.C. 154(b) by 315 days.

(21) Appl. No.: 16/095,225

(22) PCT Filed: Apr. 21, 2017

(86) PCT No.: PCT/EP2017/059558
§ 371 (c)(1),
(2) Date: Oct. 19, 2018

(87) PCT Pub. No.: WO2017/186596
PCT Pub. Date: Nov. 2, 2017

(65) Prior Publication Data
US 2019/0134816 A1 May 9, 2019

(30) Foreign Application Priority Data
Apr. 24, 2016 (DE) .................. 10 2016 004 836.0

(51) Int. Cl.
*B25J 9/16* (2006.01)
(52) U.S. Cl.
CPC ........... *B25J 9/1674* (2013.01); *B25J 9/1694* (2013.01); *G05B 2219/40311* (2013.01)
(58) Field of Classification Search
CPC ...... B25J 9/1674; B25J 9/1694; B25J 9/1684; G05B 2219/40311
See application file for complete search history.

(56) References Cited

U.S. PATENT DOCUMENTS

| 2003/0225479 A1 | 12/2003 | Waled |
| 2011/0071679 A1 | 3/2011 | Barajas et al. |

(Continued)

FOREIGN PATENT DOCUMENTS

| CN | 104969134 A | 10/2015 |
| DE | 11 2014 000 700 T5 | 10/2015 |

(Continued)

OTHER PUBLICATIONS

Machine translation for DE112014000700, Shiratsuchi Koji, Oct. 2015 (Year: 2015).*

(Continued)

*Primary Examiner* — Jeff A Burke
*Assistant Examiner* — Mohamad O El Sayah
(74) *Attorney, Agent, or Firm* — Hoffmann & Baron, LLP

(57) ABSTRACT

The invention relates to a method for controlling a robot system as well as a robot system. The robot system includes the following components: a robot ROBO with elements driven by actuators; first sensors S1i for sensing a current robot state; a central control unit ZSE, which executes a current control program SP(t) for controlling the robot system; one or more user interfaces $NS_p$; one or more processor units $PE_r$ (205), which execute services MPSr for the central control unit ZSE and/or for one or more of the other components of the robot system; wherein the robot ROBO, the first sensors $S1_i$, the central control unit ZSE, the user interfaces $NS_p$, and the processor units $PE_r$ communicate with one another over a data network DN. The central control unit ZSE is configured and executed to predictively test whether an execution of the current control program SP(t) will lead to an error state. If such an error state is predicted during the test, execution of one or more actions takes place.

21 Claims, 2 Drawing Sheets

(56) References Cited

U.S. PATENT DOCUMENTS

| | | | |
|---|---|---|---|
| 2013/0039730 A1 | 2/2013 | Sueyoshi et al. | |
| 2014/0297037 A1 | 10/2014 | Hayashi | |
| 2015/0328776 A1 | 11/2015 | Shiratsuchi | |
| 2017/0106530 A1* | 4/2017 | Shimokawa | G06F 11/00 |

FOREIGN PATENT DOCUMENTS

| | | | |
|---|---|---|---|
| DE | 112014000700 T5 * | 10/2015 | B25J 9/1676 |
| EP | 0889383 A1 | 7/1999 | |
| EP | 1 598 156 A1 | 11/2005 | |
| EP | 1598156 A1 * | 11/2005 | B25J 9/1674 |
| EP | 2 671 691 A2 | 12/2013 | |
| EP | 2671691 A2 | 12/2013 | |
| JP | 58-177294 A | 10/1983 | |
| JP | 61-123906 A | 6/1986 | |
| JP | 63-256384 A | 10/1988 | |
| JP | 3-7080 A | 1/1991 | |
| JP | 2001-100805 A | 4/2001 | |
| JP | 2007-233817 A | 9/2007 | |
| JP | 2009-217713 A | 9/2009 | |
| JP | 2010-142944 A | 7/2010 | |
| JP | 2012-086319 A | 5/2012 | |
| JP | 2014-195849 A | 10/2014 | |
| KR | 10-2015-0103257 A | 9/2015 | |

OTHER PUBLICATIONS

English translation of the International Preliminary Report on Patentability dated Nov. 8, 2018 for International Application No. PCT/EP2017/059558.

English-language summary of an Office Action issued in Chinese Application No. 201780024624.9 dated Oct. 28, 2021.

* cited by examiner

CONTROL OF A ROBOT SYSTEM

CROSS-REFERENCE TO RELATED APPLICATIONS

This application is the U.S. National Phase of International Patent Application No. PCT/EP2017/059558, filed on 21 Apr. 2017, which claims benefit of German Patent Application No. 102016004836.0, filed on 24 Apr. 2016, the contents of which are incorporated herein by reference in their entirety.

BACKGROUND

Field

The invention relates to a method of controlling a robot system as well as a robot system.

Related Art

The robot system in this case includes a robot with components driven by actuators; sensors for sensing a current state of the robot; a central control unit, which executes a current control program for controlling and coordinating the robot system; one or more user interfaces; wherein the user interfaces and the control unit are configured for modifying the current control program during the execution thereof into a modified control program; and one or more processor units, which execute services for the central control unit. The robot, the sensors, the central control unit, the user interfaces, and the processor units in this case communicate with one another over a dynamic data network, which is possibly time-variant.

Especially when robots of such robot systems with components driven by actuators can interact with humans, it is necessary, for increasing safety, that the current control program be correctly executable and sturdy, and have almost no errors that could lead to undesirable robot states that are hazardous to humans, and/or the environment, and/or the robot.

SUMMARY

The object of the invention is to provide an improved method of controlling a robot system as well as a robot system that has increased, i.e., improved, safety when executing a control program.

The invention results from the features of the main claims. Advantageous further embodiments and designs are the subject matter of the dependent claims. Further features, application options, and advantages of the invention result from the following description, and explanation, of example embodiments of the invention, which are represented in the figures.

A first aspect of the invention relates to a method of controlling a robot system, wherein the robot system includes the following components: a robot ROBO with elements driven by actuators; first sensors $S1_i$ for sensing a current robot state $Z_{robo}(t)$, where i=1, . . . , I; a central control unit ZSE, which executes a current control program SP(t) for controlling and coordinating the robot system; one or more user interfaces $NS_p$, which, together with the control unit, are configured for modifying the current control program SP(t), during the execution thereof at a time $t_1$, into a modified control program SP(t)=SP*(t for t>$t_1$), where p=1, . . . , P; and one or more processor units $PE_r$, which execute services $MPS_r$ for the central control unit ZSE and/or for one or more of the other components of the robot system, where r=1, . . . , R.

The term "current robot state $Z_{robo}(t)$" is understood to be broadly formulated. It includes, inter alia, mechanical, dynamic, electric, and data-based, time-dependent states of the robot. Furthermore, the term includes states of the robot independent of time such as, for example, the mechanical setup state/configuration thereof, etcetera.

The control unit ZSE is advantageously designed as a computer or processor, which controls and coordinates the robot system, with all of its listed components, based on the current control program SP(t).

The term "a current control program SP(t)" is understood to be a sequence of instructions that satisfies the rules of a certain control programming language. The control program SP(t) may include auxiliary control programs, so-called apps (application software), etcetera.

The central control unit ZSE is connected to one or more processor units $PE_r$, which execute services $MPS_r$ for the central control unit ZSE, where r=1, . . . , R.

The term "processor units $PE_r$" is understood to be broadly formulated. It essentially includes all units having their own processor, i.e., their own data processing, which provides, in the broadest of terms, a "service" for the robot system and/or for one or more of its components. These services are characterized in this case as services $MPS_r$. They depend particularly on the type of the respective processor units $PE_r$.

Thus, a processor unit $PE_r$ may exclusively further process data coming from the control unit ZSE and/or other components of the robot system, for example, show data or the further processing results thereof, or generate an action, a service, etc. based on the data coming from the control unit ZSE and/or other components of the robot system. Particularly, output units for outputting optical, tactile, and/or acoustic information fall into this category of processor units.

Furthermore, a processor unit $PE_r$ can further process data coming from the control unit ZSE and/or other components of the robot system, and transmit the result of the further processing to the control unit ZSE and/or to the other components. In this variant, multiple processor units $PE_r$, arranged in a dispersed manner are joined together to provide an increased computing capacity, in order to enable, for example, complex computations in a short period of time. In this variant, time-parallel, diverse tasks may be further executed by various processor units $PE_r$, the results of which are transmitted to the control unit ZSE and/or to other components of the robot system for further processing.

Finally, a processor unit $PE_r$ may exclusively generate data itself, which are transmitted to the control unit ZSE and/or to other components of the robot system. This category includes, for example, all sensor systems that acquire, optionally pre-process, and transmit measurement data to the control unit ZSE and/or to other components of the robot system over their own interface.

User interfaces $NS_p$ are advantageously equipped with a monitor/display and an interface for manual and/or acoustic input of data and information. The user interfaces $NS_p$ are advantageously, for example, computer terminals, notebooks, and smart phones. The user interfaces $NS_p$ and the control unit ZSE are configured for modifying the current control program SP(t), during the execution thereof at a time $t_1$, into a modified control program SP(t)=SP*(t for t>$t_1$), wherein changes entered via the user interfaces $NS_p$ are advantageously implemented sequentially in the current control program SP(t), where p=1, . . . , P. The formula SP(t)=SP*(t for t>$t_1$) means that the current control program, which is always characterized with SP(t), is specified by the control program SP*(t for t>$t_1$), starting at the time $t_1$.

According to the invention, the robot, the first sensors $S1_i$, the central control unit ZSE, the user interfaces $NS_p$, and the processor units $PEr_r$ are connected to one another over a possibly dynamic and/or time-variant data network DN such that corresponding data communication can take place among the components of the robot system.

Advantageously, the individual components of the robot system communicate over electrical and/or optical data lines. The data exchanged among components are advantageously encrypted.

The robot ROBO can accept robot states $Z_{robo}$ according to the invention, wherein the following applies: $Z_{robo} \in Z_{robo,total}$ and $Z_{robo,total}$ defines a state space, which indicates the quantities of all possible robot states, and wherein a state space $Z_{robo,permitted}$ is further specified, which defines the quantity of all permitted robot states $Z_{robo,permitted}$, wherein the following applies: $Z_{robo,permitted} \in Z_{robo,permitted}$ and $Z_{robo,permitted} \subseteq Z_{robo,total}$.

The first sensors $S1_i$ can accept sensor states $Z_{S1,i}$ according to the invention, wherein the following applies: $Z_{S1,i} \in Z_{S1,i,total}$ and $Z_{S1,i,total}$ defines a state space, which indicates the quantities of all possible sensor states, and wherein a state space $Z_{S1,i,permitted}$ is further specified, which defines the quantity of all permitted sensor states $Z_{S1,i,permitted}$, wherein the following applies: $Z_{S1,i,permitted} \in Z_{S1,i,permitted}$ and $Z_{S1,i,permitted} \subseteq Z_{S1,i,total}$.

The control unit ZSE can accept control unit states $Z_{ZSE}$ according to the invention, wherein the following applies: $Z_{ZSE} \in Z_{ZSE,total}$ and $Z_{ZSE,total}$ defines a state space, which indicates the quantities of all possible control unit states, and wherein a state space $Z_{ZSE,permitted}$ is further specified, which defines the quantity of all permitted control unit states $Z_{ZSE,permitted}$, wherein the following applies: $Z_{ZSE,permitted} \in Z_{ZSE,permitted}$ and $Z_{ZSE,permitted} \subseteq Z_{ZSE,total}$.

The user interfaces $NS_p$ can accept user interface states $Z_{NS,p}$ according to the invention, wherein the following applies: $Z_{NS,p} \in Z_{NS,p,total}$ and $Z_{NS,p,total}$ defines a state space, which indicates the quantities of all possible user interface states, and wherein a state space $Z_{NS,p,permitted}$ is further specified, which defines the quantity of all permitted user interface states $Z_{NS,p,permitted}$, wherein the following applies: $Z_{NS,p,permitted} \in Z_{NS,p,permitted}$ and $Z_{NS,p,permitted} \subseteq Z_{NS,p,total}$.

The processor units $PE_r$ can accept processor states $Z_{PE,r}$ according to the invention, wherein the following applies: $Z_{PE,r} \in Z_{PE,r,total}$ and $Z_{PE,r,total}$ defines a state space, which indicates the quantities of all possible processor states, and wherein a state space $Z_{PE,r,permitted}$ is further specified, which defines the quantity of all permitted processor states $Z_{PR,r,permitted}$, wherein the following applies: $Z_{PE,r,permitted} \in Z_{PE,r,permitted}$ and $Z_{PE,r,permitted} \subseteq Z_{PE,r,total}$. The term "processor state" here is understood to be broadly formulated. It includes, for example, all electric, mechanical, temperature-dependent, data-related, operating, etc. states of the processor units $PE_r$ that are technically ascertainable.

The services $MPS_r$ can accept service states $Z_{MPS,r}$ according to the invention, wherein the following applies: $Z_{MPS,r} \in Z_{MPS,r,total}$ and $Z_{MPS,r,total}$ defines a state space, which indicates the quantities of all possible service states, and wherein a state space $Z_{MPS,r,permitted}$ is further specified, which defines the quantity of all permitted service states $Z_{MPS,r,permitted}$, wherein the following applies: $Z_{MPS,r,permitted} \in Z_{MPS,r,permitted}$ and $Z_{MPS,r,permitted} \subseteq Z_{MPS,r,total}$. The term "service state" here is understood to be broadly formulated. It includes, for example, all electric, mechanical, temperature-dependent, data-related, operating, etc. states of a service $MPS_r$ that are technically ascertainable.

According to the invention, the date network DN can potentially accept dynamic and/or time-variant data network states $Z_{data}$, wherein the following applies: $Z_{data} \in Z_{data,total}$ and $Z_{data,total}$ defines a state space, which indicates the quantities of all possible data network states, and wherein a state space $Z_{data,permitted}$ is further specified, which defines the quantity of all permitted data network states $Z_{data,permitted}$, wherein the following applies: $Z_{data,permitted} \in Z_{data,permitted}$ and $Z_{data,permitted} \subseteq Z_{data,total}$. The term "data network state" here is understood to be broadly formulated. It includes, for example, all electric, mechanical, temperature-dependent, data-related, operating, etc. states of the data network DN that are technically ascertainable.

The proposed method includes the following steps: predictively testing, during the execution of the current control program SP(t), to determine whether a complete execution of the current control program SP(t) will lead to an error state, wherein the error state is defined such that the execution of the current control program SP(t) leads to a:

robot state $Z_{robo}$, to which the following applies: $Z_{robo} \notin Z_{robo,permitted}$ and/or sensor state $Z_{S1,i}$, to which the following applies: $Z_{S1,i} \notin Z_{S1,i,permitted}$ and/or control unit state $Z_{ZSE}$, to which the following applies: $Z_{ZSE} \notin Z_{ZSE,permitted}$ and/or processor state $Z_{PE,r}$, to which the following applies: $Z_{PR,r} \notin Z_{PR,r,permitted}$ and/or service state $Z_{MPS,r}$, to which the following applies: $Z_{MPS,r} \notin Z_{MPS,r,permitted}$ and/or user interface state $Z_{NS,p}$, to which the following applies: $Z_{NS,p} \notin Z_{NS,p,permitted}$ and/or data network state $Z_{data}(t)$, to which the following applies: $Z_{data} \notin Z_{data,permitted}$ and, if such an error state is predicted during the testing, executing one or more of the following listed actions:

automatic modifying of the current control program SP(t) such that no error state is determined with a new predictive test, and execution of the automatically, correspondingly modified control program SP(t);

generating a prompt to modify the current control program SP(t) on one or all user interfaces $NS_p$;

generating an optical or acoustic warning;

stopping the execution of the current control program SP(t);

activating the robot ROBO to take on a predefined standby state;

The proposed method thus executes a predictive test for each current control program SP(t) to determine whether an execution of the complete or to-be-processed current control program SP(t) will lead to an error state. In doing so, a modified current control program SP(t) does not have to be executed completely, which means that this test will have a predictive character. That is, it is not a requirement to wait until the current control program SP(t) generates an error during its execution; instead, these potential errors states can be detected in advance with the present method. This particularly ensures that the robot system will not enter a state that threatens safety. This is particularly advantageous for robot systems including a robot, which interacts with humans and/or dynamic environments.

This predictive test advantageously takes place at the same time as the execution of the current control program SP(t) and advantageously particularly for the part of the control program yet to be processed. In a preferred alternative, this test is executed for the entire modified current control program after a change to the current control program.

An advantageous refinement of the proposed method is characterized in that the state spaces $\underline{Z}_{robo,permitted}$, $\underline{Z}_{S1,i,permitted}$, $\underline{Z}_{ZSE,permitted}$, $\underline{Z}_{PR,r,permitted}$, $\underline{Z}_{MPS,r,permitted}$, $\underline{Z}_{NS,p,permitted}$, $\underline{Z}_{data,permitted}$ are defined as a function of an output/action, which is intended to be executed by the robot ROBO by using the control program SP(t). This enables a specification of the state spaces optimized to the task and/or action executable by a robot, and thus a specific definition of error states as a function of the task and/or action.

An advantageous refinement of the proposed method is characterized in that the control program SP(t) is introspective, i.e., that the control program SP(t) recognizes its own structure and can modify it.

Advantageously, the data network state $Z_{data}$ considers one or more of the following parameters:
  physical availability of the components: robot ROBO, first sensors $S1_i$, central control unit ZSE, user interfaces $NS_p$, and processor units $PE_r$ in the data network DN;
  a current communication state among the components;
  data and signal runtimes among the components; and
  chronological and causal limitations of a data exchange among the components.

Advantageously, the robot state $Z_{robo}$ considers one or more of the following parameters:
  current physical configuration of the robot ROBO;
  a dynamic state of the robot ROBO;
  an electric state of the robot ROBO; and
  interaction(s) of the robot ROBO with an environment.

Advantageously, the processor state $Z_{PE,r}$ considers one or more of the following parameters:
  service or algorithm currently being executed on the processor unit;
  current performance of the service or algorithm being executed on the processor unit;
  available processor capacity of the processor unit;
  current load of the processor unit;
  available working memory of the processor unit;
  state of the control bus of the respective processor unit;
  architecture of the processor unit;
  command set of the processor unit; and
  cycling of the processor unit.

Advantageously, the service state $Z_{MPS,r}$ considers one or more of the following parameters:
  a current physical/mechanical configuration of the robot ROBO;
  a dynamic state of the robot ROBO;
  an electric state of the robot ROBO; and
  interaction(s) of the robot ROBO with an environment.

The invention further relates to a computer system with a data processing device, wherein the data processing device is designed such that a previously described method is executed on a data processing device.

The invention further relates to a digital memory medium with electronically readable control signals, wherein the control signals can cooperate with a programmable computer system such that a previously described method is executed.

The invention further relates to a computer program product with a memory code, stored on a machine-readable carrier, for executing a previously described method when the program code is executed on a data processing device.

The invention further relates to a computer program with program codes for executing a previously described method when the program is running on a data processing device. To this end, the data processing device may be designed as any computer system known from the prior art.

Finally, the invention relates to a robot system, including the following components:
a robot ROBO with elements driven by actuators; first sensors $S1_i$ for sensing a current robot state $Z_{robo}(t)$, where i=1, . . . , I; a central control unit ZSE, which executes a current control program SP(t) for controlling the robot system; one or more user interfaces $NS_p$, where p=1, . . . , P; one or more processor units $PE_r$, which execute services $MPS_r$ for the central control unit ZSE and/or for one or more of the other components of the robot system, where r=1, . . . , R; wherein the robot ROBO, the first sensors $S1_i$, the central control unit ZSE, the user interfaces $NS_p$, and the processor units $PE_r$ communicate with each other over a data network DN; and wherein the central control unit ZSE and the user interfaces $NS_p$ are configured for modifying the current control program SP(t), during the execution thereof at a time $t_1$, into a modified control program SP(t)=SP*(t for t>$t_1$).

According to the invention, the robot ROBO can accept robot states $Z_{robo}$, wherein the following applies: $Z_{robo} \in \underline{Z}_{robo,total}$ and $\underline{Z}_{robo,total}$ defines a state space, which indicates the quantities of all possible robot states, and wherein a state space $\underline{Z}_{robo,permitted}$ is further specified, which defines the quantity of all permitted robot states $Z_{robo,permitted}$, wherein the following applies: $Z_{robo,permitted} \in \underline{Z}_{robo,permitted}$ and $\underline{Z}_{robo,permitted} \subseteq \underline{Z}_{robo,total}$.

According to the invention, the first sensors $S1_i$ can accept sensor states $Z_{S1,i}$, wherein the following applies: $Z_{S1,i} \in \underline{Z}_{S1,i,total}$ and $\underline{Z}_{S1,i,total}$ defines a state space, which indicates the quantities of all possible sensor states, and wherein a state space $\underline{Z}_{S1,i,permitted}$ is further specified, which defines the quantity of all permitted sensor states $Z_{S1,i,permitted}$, wherein the following applies: $Z_{S1,i,permitted} \in \underline{Z}_{S1,i,permitted}$ and $\underline{Z}_{S1,i,permitted} \subseteq \underline{Z}_{S1,i,total}$.

According to the invention, the control unit ZSE can accept control unit states $Z_{ZSE}$, wherein the following applies: $Z_{ZSE} \in \underline{Z}_{ZSE,total}$ and $\underline{Z}_{ZSE,total}$ defines a state space, which indicates the quantities of all possible control unit states, and wherein a state space $\underline{Z}_{ZSE,permitted}$ is further specified, which defines the quantity of all permitted control unit states $Z_{ZSE,permitted}$, wherein the following applies: $Z_{ZSE,permitted} \in \underline{Z}_{ZSE,permitted}$ and $\underline{Z}_{ZSE,permitted} \subseteq \underline{Z}_{ZSE,total}$.

According to the invention, the user interfaces $NS_p$ can accept user interface states $Z_{NS,p}$, wherein the following applies: $Z_{NS,p} \in \underline{Z}_{NS,p,total}$ and $\underline{Z}_{NS,p,total}$ defines a state space, which indicates the quantities of all possible user interface states, and wherein a state space $\underline{Z}_{NS,p,permitted}$ is further specified, which defines the quantity of all permitted user interface states $Z_{NS,p,permitted}$, wherein the following applies: $Z_{NS,p,permitted} \in \underline{Z}_{NS,p,permitted}$ and $\underline{Z}_{NS,p,permitted} \subseteq \underline{Z}_{NS,p,total}$.

According to the invention, the processor units $PEr_r$ 205 can accept processor states $Z_{PE,r}$, wherein the following applies: $Z_{PE,r} \in \underline{Z}_{PE,r,total}$ and $\underline{Z}_{PE,r,total}$ defines a state space, which indicates the quantities of all possible processor states, and wherein a state space $\underline{Z}_{PE,r,permitted}$ is further specified, which defines the quantity of all permitted processor states $Z_{PR,r,permitted}$, wherein the following applies: $Z_{PE,r,permitted} \in \underline{Z}_{PE,r,permitted}$ and $\underline{Z}_{PE,r,permitted} \subseteq \underline{Z}_{PE,r,total}$.

According to the invention, the services $MPS_r$ can accept service states $Z_{MPS,r}$, wherein the following applies: $Z_{MPS,r} \in \underline{Z}_{MPS,r,total}$ and $\underline{Z}_{MPS,r,total}$ defines a state space, which indicates the quantities of all possible service states, and wherein a state space $\underline{Z}_{MPS,r,permitted}$ is further specified, which defines the quantity of all permitted service states $Z_{MPS,r,permitted}$, wherein the following applies: $Z_{MPS,r,permitted} \in \underline{Z}_{MPS,r,permitted}$ and $\underline{Z}_{MPS,r,permitted} \subseteq \underline{Z}_{MPS,r,total}$.

According to the invention, the data network DN can accept data network states $Z_{data}$, wherein the following applies: $Z_{data} \in \underline{Z}_{data,total}$ and $\underline{Z}_{data,total}$ defines a state space, which indicates the quantities of all possible data network states, and wherein a state space $\underline{Z}_{data,permitted}$ is further specified, which defines the quantity of all permitted data network states $Z_{data,permitted}$, wherein the following applies: $Z_{data,permitted} \in \underline{Z}_{data,permitted}$ and $\underline{Z}_{data,permitted} \subseteq \underline{Z}_{data,total}$.

The control unit ZSE of the proposed robot system is further executed and configured such that the following operations are executed:

predictively testing, during or before the execution of the current control program SP(t), to determine whether a complete execution of the current control program SP(t) will lead to an error state, wherein the error state is defined such that the execution of the current control program SP(t) leads to a:

robot state $Z_{robo}$, to which the following applies: $Z_{robo} \notin \underline{Z}_{robo,permitted}$ and/or sensor state $Z_{S1,i}$, to which the following applies: $Z_{S1,i} \notin \underline{Z}_{S1,i,permitted}$ and/or control unit state $Z_{ZSE}$, to which the following applies: $Z_{ZSE} \notin \underline{Z}_{ZSE,permitted}$ and/or processor state $Z_{PE,r}$, to which the following applies: $Z_{PR,r} \notin \underline{Z}_{PR,r,permitted}$ and/or service state $Z_{MPS,r}$, to which the following applies: $Z_{MPS,r} \notin \underline{Z}_{MPS,r,permitted}$ and/or user interface state $Z_{NS,p}$, to which the following applies: $Z_{NS,p} \notin \underline{Z}_{NS,p,permitted}$ and/or data network state $Z_{data}(t)$, to which the following applies: $Z_{data} \notin \underline{Z}_{data,permitted}$.

If such an error state is predicted during the testing, the control unit initiates execution of one or more of the following listed actions:

automatically modifying of the current control program SP(t) such that no error state is determined with a new predictive test, and executing the automatically, correspondingly modified control program SP(t);

generating a prompt to modify the current control program SP(t) on one or all user interfaces $NS_p$;

generating an optical or acoustic warning;

stopping the execution of the current control program SP(t); and activating the robot ROBO to take on a predefined standby state.

Advantages and advantageous refinements of the proposed robot system result from an analogous and corresponding transfer of the statements made regarding the proposed method.

Other advantages, features, and details result from the following description, in which at least one exemplary embodiment is described in detail—optionally with reference to the drawing. Equivalent, similar, and/or functionally equivalent parts have been given the same reference numbers.

DETAILED DESCRIPTION

Figure 1:
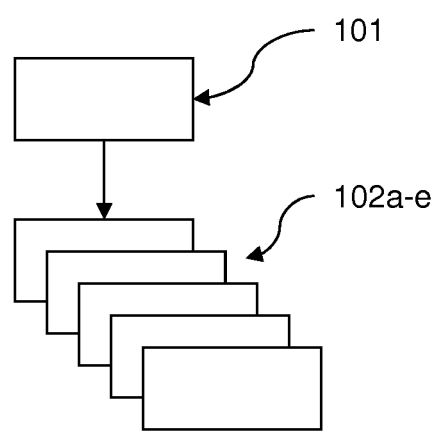
FIG. 1 shows a flowchart of the proposed method.

FIG. 1 shows a flowchart of a proposed method for controlling a robot system, wherein the robot system includes the following components: a robot ROBO 201 with elements driven by actuators; first sensors $S1_i$ 202 for sensing a current robot state $Z_{robo}(t)$, where i=1, . . . , I; a control unit ZSE 203, which executes a current control program SP(t) for controlling the robot system; one or more user interfaces $NS_p$ 204, where p=1, . . . , P; one or more processor units $PE_r$, which execute services $MPS_r$ for the central control unit ZSE and/or for one or more of the other components of the robot system, where r=1, . . . , R; wherein the robot, the first sensors $S1_i$ 202, the central control unit ZSE 203, the user interfaces $NS_p$ 204, and the processor units $PE_r$ 205 communicate with each other over a data network DN 206; and wherein the central control unit ZSE 203 and the user interfaces $NS_p$ 204 are configured for modifying the current control program SP(t), during the execution thereof at a time $t_1$, into a modified control program SP(t)=SP*(t for t>$t_1$).

The robot ROBO 201 can accept robot states $Z_{robo}$, wherein the following applies: $Z_{robo} \in \underline{Z}_{robo,total}$ and $\underline{Z}_{robo,total}$ defines a state space, which indicates the quantities of all possible robot states, and wherein a state space $\underline{Z}_{robo,permitted}$ is further specified, which defines the quantity of all permitted robot states $Z_{robo,permitted}$, wherein the following applies: $Z_{robo,permitted} \in \underline{Z}_{robo,permittedl}$ and $\underline{Z}_{robo,permitted} \subseteq \underline{Z}_{robo,total}$.

The first sensors $S1_i$ can accept sensor states $Z_{S1,i}$ 202, wherein the following applies: $Z_{S1,i} \in \underline{Z}_{S1,i,total}$ and $\underline{Z}_{S1,i,total}$ defines a state space, which indicates the quantities of all possible sensor states, and wherein a state space $\underline{Z}_{S1,i,permitted}$ is further specified, which defines the quantity of all permitted sensor states $Z_{S1,i,permitted}$, wherein the following applies: $Z_{S1,i,permitted} \in \underline{Z}_{S1,i,permittedl}$ and $\underline{Z}_{S1,i,permitted} \subseteq \underline{Z}_{S1,i,total}$.

The control unit ZSE 203 can accept control unit states $Z_{ZSE}$, wherein the following applies: $Z_{ZSE} \in \underline{Z}_{ZSE,total}$ and $\underline{Z}_{ZSE,total}$ defines a state space, which indicates the quantities of all possible control unit states, and wherein a state space $\underline{Z}_{ZSE,permitted}$ is further specified, which defines the quantity of all permitted control unit states $Z_{ZSE,permitted}$, wherein the following applies: $Z_{ZSE,permitted} \in \underline{Z}_{ZSE,permittedl}$ and $\underline{Z}_{ZSE,permitted} \subseteq \underline{Z}_{ZSE,total}$.

The user interfaces $NS_p$ 204 can accept user interface states $Z_{NS}$, wherein the following applies: $Z_{NS,p} \in \underline{Z}_{NS,p,total}$ and $\underline{Z}_{NS,p,total}$ defines a state space, which indicates the quantities of all possible user interface states, and wherein a state space $\underline{Z}_{NS,p,permitted}$ is further specified, which defines the quantity of all permitted user interface states $Z_{NS,p,permitted}$, wherein the following applies: $Z_{NS,p,permitted} \in \underline{Z}_{NS,p,permitted}$ and $\underline{Z}_{NS,p,permitted} \subseteq \underline{Z}_{NS,p,total}$.

The processor units $PE_r$ 205 can accept processor states $Z_{PE,r}$, wherein the following applies: $Z_{PE,r} \in \underline{Z}_{PE,r,total}$ and $\underline{Z}_{PE,r,total}$ defines a state space, which indicates the quantities of all possible processor states, and wherein a state space $\underline{Z}_{PE,r,permitted}$ is further specified, which defines the quantity of all permitted processor states $Z_{PR,r,permitted}$, wherein the following applies: $Z_{PE,r,permitted} \in \underline{Z}_{PE,r,permitted}$ and $\underline{Z}_{PE,r,permitted} \subseteq \underline{Z}_{PE,r,total}$.

The services $MPS_r$ can accept service states $Z_{MPS,r}$, wherein the following applies: $Z_{MPS,r} \in \underline{Z}_{MPS,r,total}$ and $\underline{Z}_{MPS,r,total}$ defines a state space, which indicates the quantities of all possible service states, and wherein a state space $\underline{Z}_{MPS,r,permitted}$ is further specified, which defines the quantity of all permitted service states $Z_{MPS,r,permitted}$, wherein the following applies: $Z_{MPS,r,permitted} \in \underline{Z}_{MPS,r,permitted}$ and $\underline{Z}_{MPS,r,permitted} \subseteq \underline{Z}_{MPS,r,total}$.

The data network DN 206 can accept data network states $Z_{data}$, wherein the following applies: $Z_{data} \in \underline{Z}_{data,total}$ and $\underline{Z}_{data,total}$ defines a state space, which indicates the quantities of all possible data network states, and wherein a state space $\underline{Z}_{data,permitted}$ is further specified, which defines the quantity of all permitted data network states $Z_{data,permitted}$, wherein the following applies: $Z_{data,permitted} \in \underline{Z}_{data,permitted}$ and $\underline{Z}_{data,permitted} \subseteq \underline{Z}_{data,total}$.

The proposed method includes the following steps: In a first step 101, predictive testing takes place, during or before the execution of the current control program SP(t), to determine whether an execution of the current control program SP(t) will lead to an error state, wherein the error state is defined such that the execution of the current control program SP(t) leads to a:

- robot state $Z_{robo}$, to which the following applies: $Z_{robo} \notin \underline{Z}_{robo,permitted}$ and/or
- sensor state $Z_{S1,i}$, to which the following applies: $Z_{S1,i} \notin \underline{Z}_{S1,i,permitted}$ and/or
- control unit state $Z_{ZSE}$, to which the following applies: $Z_{ZSE} \notin \underline{Z}_{ZSE,permitted}$ and/or
- processor state $Z_{PE,r}$, to which the following applies: $Z_{PR,r} \notin \underline{Z}_{PR,r,permitted}$ and/or
- service state $Z_{MPS,r}$, to which the following applies: $Z_{MPS,r} \notin \underline{Z}_{MPS,r,permitted}$ and/or
- user interface state $Z_{NS,p}$, to which the following applies: $Z_{NS,p} \notin \underline{Z}_{NS,p,permitted}$ and/or
- data network state $Z_{data}(t)$, to which the following applies: $Z_{data} \notin \underline{Z}_{data,permitted}$.

If such an error state is predicted during the test 101, execution 102 of one or more of the following listed actions occurs in a second step:

- automatic modifying (102a) of the current control program SP(t) such that no error state is determined with a new predictive test (101), and execution of the automatically, correspondingly modified control program SP(t);
- generating (102b) a prompt to modify the current control program SP(t) on one or all user interfaces $NS_p$;
- generating (102c) an optical or acoustic warning;
- stopping (102d) the execution of the current control program SP(t); and
- activating (102e) the robot ROBO to take on a predefined standby state.

Advantageously, the method is triggered by any change in the current control program SP(t).

Figure 2:
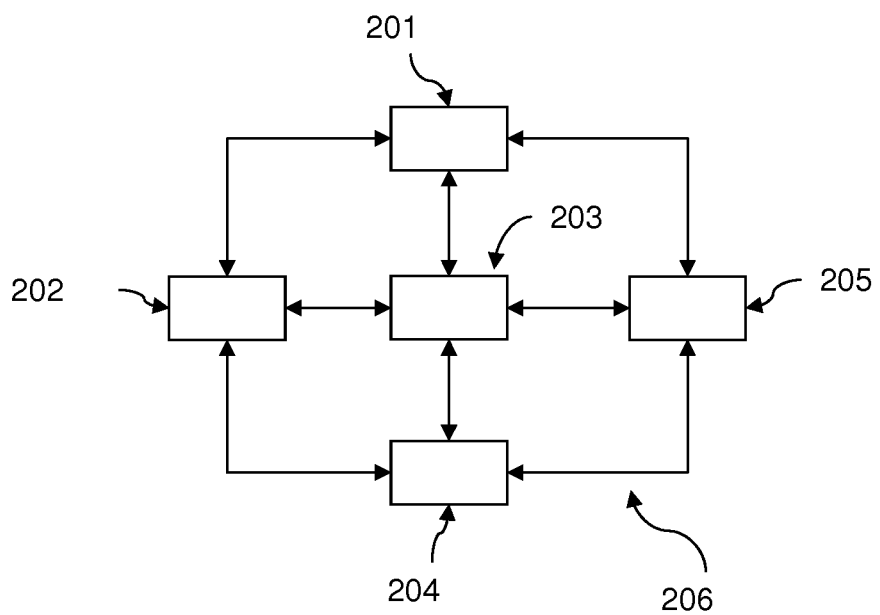
FIG. 2 shows a diagram representation of a proposed robot system.

FIG. 2 shows a diagram representation of a proposed robot system; The robot system includes the following components: a robot ROBO 201 with elements driven by actuators; first sensors $S1_i$ 202 for sensing a current robot state $Z_{robo}(t)$, where $i=1, \ldots, I$; a central control unit ZSE 203, which executes a current control program SP(t) for controlling the robot system; one or more user interfaces $NS_p$ 204 where $p=1, \ldots, P$; one or more processor units PE 205, which execute services $MPS_r$ for the central control unit ZSE 203 and/or for one or more of the other components of the robot system 201, 202, 204, 205, 206, where $r=1, \ldots, R$.

The central control unit ZSE 203 and the user interfaces $NS_p$ 204 are configured to modify the current control program SP(t), during the execution thereof at a time $t_1$, into a modified control program SP(t)=SP*(t for $t>t_1$).

The robot 201, the first sensors $S1_i$ 202, the central control unit ZSE 203, the user interfaces $NS_p$ 204, and the processor units $PE_r$ 205 communicate with one another over a data network DN 206.

The robot ROBO 201 can accept robot states $Z_{robo}$, wherein the following applies: $Z_{robo} \in \underline{Z}_{robo,total}$ and $\underline{Z}_{robo,total}$ defines a state space, which indicates the quantities of all possible robot states, and wherein a state space $\underline{Z}_{robo,permitted}$ is further specified, which defines the quantity of all permitted robot states $Z_{robo,permitted}$, wherein the following applies: $Z_{robo,permitted} \in \underline{Z}_{robo,permitted}$ and $\underline{Z}_{robo,permitted} \subseteq \underline{Z}_{robo,total}$.

The first sensors $S1_i$ can accept sensor states $Z_{S1,i}$ 202, wherein the following applies: $Z_{S1,i} \in \underline{Z}_{S1,i,total}$ and $\underline{Z}_{S1,i,total}$ defines a state space, which indicates the quantities of all possible sensor states, and wherein a state space $\underline{Z}_{S1,i,permitted}$ is further specified, which defines the quantity of all permitted sensor states $Z_{S1,i,permitted}$, wherein the following applies: $Z_{S1,i,permitted} \in \underline{Z}_{S1,i,permitted}$ and $\underline{Z}_{S1,i,permitted} \subseteq \underline{Z}_{S1,i,total}$.

The control unit ZSE 203 can accept control unit states $Z_{ZSE}$, wherein the following applies: $Z_{ZSE} \in \underline{Z}_{ZSE,total}$ and $\underline{Z}_{ZSE,total}$ defines a state space, which indicates the quantities of all possible control unit states, and wherein a state space $\underline{Z}_{ZSE,permitted}$ is further specified, which defines the quantity of all permitted control unit states $Z_{ZSE,permitted}$, wherein the following applies: $Z_{ZSE,permitted} \in \underline{Z}_{ZSE,permitted}$ and $\underline{Z}_{ZSE,permitted} \subseteq \underline{Z}_{ZSE,total}$.

The user interfaces $NS_p$ 204 can accept user interface states $Z_{NS,p}$, wherein the following applies: $Z_{NS,p} \in \underline{Z}_{NS,p,total}$ and $\underline{Z}_{NS,p,total}$ defines a state space, which indicates the quantities of all possible user interface states, and wherein a state space $\underline{Z}_{NS,p,permitted}$ is further specified, which defines the quantity of all permitted user interface states $Z_{NS,p,permitted}$, wherein the following applies: $Z_{NS,p,permitted} \in \underline{Z}_{NS,p,permitted}$ and $\underline{Z}_{NS,p,permitted} \subseteq \underline{Z}_{NS,p,total}$.

The processor units $PE_r$ can accept processor states $Z_{PE,r}$, wherein the following applies: $Z_{PE,r} \in \underline{Z}_{PE,r,total}$ and $\underline{Z}_{PE,r,total}$ defines a state space, which indicates the quantities of all possible processor states, and wherein a state space $\underline{Z}_{PE,r,permitted}$ is further specified, which defines the quantity of all permitted processor states $Z_{PR,r,permitted}$, wherein the following applies: $Z_{PE,r,permitted} \in \underline{Z}_{PE,r,permitted}$ and $\underline{Z}_{PE,r,permitted} \subseteq \underline{Z}_{PE,r,total}$.

The services $MPS_r$ can accept service states $Z_{MPS,r}$, wherein the following applies: $Z_{MPS,r} \in \underline{Z}_{MPS,r,total}$ and $\underline{Z}_{MPS,r,total}$ defines a state space, which indicates the quantities of all possible service states, and wherein a state space $\underline{Z}_{MPS,r,permitted}$ is further specified, which defines the quantity of all permitted service states $Z_{MPS,r,permitted}$, wherein the following applies: $Z_{MPS,r,permitted} \in \underline{Z}_{MPS,r,permitted}$ and $\underline{Z}_{MPS,r,permitted} \subseteq \underline{Z}_{MPS,r,total}$.

The data network DN (206) can accept data network states $Z_{data}$, wherein the following applies: $Z_{data} \in \underline{Z}_{data,total}$ and $\underline{Z}_{data,total}$ defines a state space, which indicates the quantities of all possible data network states, and wherein a state space $\underline{Z}_{data,permitted}$ is further specified, which defines the quantity of all permitted data network states $Z_{data,permitted}$, wherein the following applies: $Z_{data,permitted} \in \underline{Z}_{data,permitted}$ and $\underline{Z}_{data,permitted} \subseteq \underline{Z}_{data,total}$.

The central control unit ZSE 203 is designed and configured such that predictive testing, during execution of the current control program SP(t), to determine whether a complete execution of the current control program SP(t) will lead to an error state, wherein the error state is defined such that complete execution of the current control program SP(t) leads to a:

- robot state $Z_{robo}$, to which the following applies: $Z_{robo} \notin \underline{Z}_{robo,permitted}$ and/or
- sensor state $Z_{S1,i}$, to which the following applies: $Z_{S1,i} \notin \underline{Z}_{S1,i,permitted}$ and/or
- control unit state $Z_{ZSE}$, to which the following applies: $Z_{ZSE} \notin \underline{Z}_{ZSE,permitted}$ and/or processor state $Z_{PE,r}$, to which the following applies: $Z_{PR,r} \notin Z_{PR,r,permitted}$ and/or service state $Z_{MPS,r}$, to which the following applies: $Z_{MPS,r} \notin Z_{MPS,r,permitted}$ and/or user interface state $Z_{NS,p}$, to which the following applies: $Z_{NS,p} \notin Z_{NS,p,permitted}$ and/or data network state $Z_{data}(t)$, to which the following applies: $Z_{data} \notin Z_{data,permitted}$, and, if such an error state is predicted during the testing, one or more of the following listed actions are executed:

automatic modifying of the current control program SP(t) such that no error state is determined with a new predictive test, and execution of the automatically, correspondingly modified control program SP(t);

generating a prompt to modify the current control program SP(t) on one or all user interfaces $NS_p$;

generating an optical or acoustic warning;

stopping the execution of the current control program SP(t); and activating the robot ROBO to take on a predefined standby state;

Although the invention has been illustrated and explained in more detail by preferred example embodiments, the invention is not limited by the disclosed examples and other variations may be derived by one of ordinary skill in the art without extending beyond the protective scope of the invention. It is thus clear that a plurality of variation options exists. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMBERS

101 Method step
102a-e Method steps
201 Robot
202 First sensors
203 Control unit
204 User interfaces
205 Processor units
206 Data network

The invention claimed is:

1. A method of controlling a robot system, wherein the robot system comprises the following components:

a robot ROBO with elements configured to be driven by actuators, first sensors $S1_i$ configured to sense a current robot state $Z_{robo}(t)$, where i=1, ..., I, a central control unit ZSE configured to execute a current control program SP(t) for controlling the robot system, one or more user interfaces $NS_p$, where p=1, ..., P, and one or more processor units $PE_r$ configured to execute services $MPS_r$ for the central control unit ZSE and/or for one or more of the other components of the robot system, where r=1, ..., R, wherein the robot ROBO, the first sensors $S1_i$, the central control unit ZSE, the user interfaces $NS_p$, and the processor units $PE_r$ are configured to communicate with one another over a data network DN, wherein the central control unit ZSE and the user interfaces $NS_p$ are configured to modify the current control program SP(t), during execution thereof at a time $t_1$, to a modified control program SP(t)=SP*(t for t>$t_1$), wherein the robot ROBO is enabled to accept robot states $Z_{robo}$, wherein the following applies: $Z_{robo} \in Z_{robo,total}$ and $Z_{robo,total}$ defines a state space, the state space $Z_{robo,total}$ indicating quantities of all possible robot states, and wherein a state space $Z_{robo,permitted}$ is further specified, the state space $Z_{robo,permitted}$ defining quantities of all permitted robot states $Z_{robo,permitted}$, wherein the following applies: $Z_{robo,permitted} \in Z_{robo,permitted}$ and $Z_{robo,permitted} \subseteq Z_{robo,total}$, wherein the first sensors $S1_i$ are enabled to accept sensor states $Z_{S1,i}$, wherein the following applies: $Z_{S1,i} \in Z_{S1,i,total}$ and $Z_{S1,i,total}$ defines a state space, the state space $Z_{S1,i,total}$ indicating quantities of all possible sensor states, and wherein a state space $Z_{S1,i,permitted}$ is further specified, the space state $Z_{S1,i,permitted}$ defining quantities of all permitted sensor states $Z_{S1,i,permitted}$, wherein the following applies: $Z_{S1,i,permitted} \in Z_{S1,i,permitted}$ and $Z_{S1,i,permitted} \subseteq Z_{S1,i,total}$, wherein the central control unit ZSE is enabled to accept control unit states $Z_{ZSE}$, wherein the following applies: $Z_{ZSE} \in Z_{ZSE,total}$ and $Z_{ZSE,total}$ defines a state space, the state space $Z_{ZSE,total}$ indicating quantities of all possible control unit states, and wherein a state space $Z_{ZSE,permitted}$ is further specified, the state space $Z_{ZSE,permitted}$ defining quantities of all permitted control unit states $Z_{ZSE,permitted}$, wherein the following applies: $Z_{ZSE,permitted} \in Z_{ZSE,permitted}$ and $Z_{ZSE,permitted} \in Z_{ZSE,total}$, wherein the user interfaces $NS_p$ are enabled to accept user interface states $Z_{NS,p}$, wherein the following applies: $Z_{NS,p} \in Z_{NS,p,total}$ and $Z_{NS,p,total}$ defines a state space, the state space $Z_{NS,p,total}$ indicating quantities of all possible user interface states, and wherein a state space $Z_{NS,p,permitted}$ is further specified, the state space $Z_{NS,p,permitted}$ defining quantities of all permitted user interface states $Z_{NS,p,permitted}$, wherein the following applies: $Z_{NS,p,permitted} \in Z_{NS,p,permitted}$ and $Z_{NS,p,permitted} \subseteq Z_{NS,p,total}$, wherein the processor units $PE_r$ are enabled to accept processor states $Z_{PE,r}$, wherein the following applies: $Z_{PE,r} \in Z_{PE,r,total}$ and $Z_{PE,r,total}$ defines a state space, the state space $Z_{PE,r,total}$ indicating quantities of all possible processor states, and wherein a state space $Z_{PE,r,permitted}$ is further specified, the state space $Z_{PE,r,permitted}$ defining quantities of all permitted processor states $Z_{PR,r,permitted}$, wherein the following applies: $Z_{PE,r,permitted} \in Z_{PE,r,permitted}$ and $Z_{PE,r,permitted} \subseteq Z_{PE,r,total}$, wherein the services $MPS_r$ are enabled to accept service states $Z_{MPS,r}$, wherein the following applies: $Z_{MPS,r} \in Z_{MPS,r,total}$ and $Z_{MPS,r,total}$ defines a state space, the state space $Z_{MPS,r,total}$ indicating quantities of all possible service states, and wherein a state space $Z_{MPS,r,permitted}$ is further specified, the state space $Z_{MPS,r,permitted}$ defining quantities of all permitted service states $Z_{MPS,r,permitted}$, wherein the following applies: $Z_{MPS,r,permitted} \in Z_{MPS,r,permitted}$ and $Z_{MPS,r,permitted} \subseteq Z_{MPS,r,total}$, wherein the data network DN is enabled to accept data network states $Z_{data}$, wherein the following applies:

$Z_{data} \in Z_{data,total}$ and $Z_{data,total}$ defines a state space, the state space $Z_{data,total}$ indicating quantities of all possible data network states, and wherein a state space $Z_{data,permitted}$ further specified, the state space $Z_{data,permitted}$ defining quantities of all permitted data network states $Z_{data,permitted}$, wherein the following applies: $Z_{data,permitted} \in Z_{data,permitted}$ and $Z_{data,permitted} \subseteq Z_{data,total}$, wherein the method comprises:

predictively testing, during execution of the current control program SP(t) at a time t, as to whether an execution of the current control program SP(t) yet to be executed at a time $t > t_1$ will lead to an error state, wherein the error state is defined such that the execution of the current control program SP(t) leads to a:

processor state $Z_{PE,r}$, to which the following applies: $Z_{PR,r} \notin Z_{PR,r,permitted}$, and/or data network state $Z_{data}(t)$, to which the following applies: $Z_{data} \notin Z_{data,permitted}$; and if such an error state is predicted during the predictively testing, executing the following listed actions:

automatically modifying the current control program at a time $t_1$ to the modified control program SP(t)=SP*(t for $t > t_1$) such that no error state is determined with a new predictive test, and executing the modified control program SP(t).

2. The method according to claim 1, wherein the state spaces $Z_{robo,permitted}$, $Z_{S1,i,permitted}$, $Z_{ZSE,permitted}$, $Z_{PR,r,permitted}$, $Z_{MPS,r,permitted}$, $Z_{NS,p,permitted}$, $Z_{data,permitted}$ are defined as a function of a task/action intended to be executed by the robot ROBO using the control program SP(t).

3. The method according to claim 1, wherein the control program SP(t) recognizes its own structure and is enabled to modify it.

4. The method according to claim 1, wherein the data network state $Z_{data}$ considers one or more of the following parameters:

a physical availability of the components: robot ROBO, first sensors $S1_i$, central control unit ZSE, user interfaces $NS_p$, and processor units $PE_r$ in the data network DN, a current communication state of the components, data and signal runtimes between the components, and chronological and causal limitations of a data exchange between the components.

5. The method according to claim 1, wherein the robot state $Z_{robo}$ considers one or more of the following parameters:

a current physical configuration of the robot ROBO, a dynamic state of the robot ROBO, an electric state of the robot ROBO, and an interaction or interactions of the robot ROBO with an environment.

6. The method according to claim 1, wherein a processor state $Z_{PE,r}$ considers one or more of the following parameters:

service or algorithm currently being executed on a processor unit $PE_r$, current performance of the service or algorithm being executed on the processor unit $PE_r$, available processor capacity of the processor unit $PE_r$, current load of the processor unit $PE_r$, available working memory of the processor unit $PE_r$, state of the control bus of the respective processor unit $PE_r$, architecture of the processor unit $PE_r$, command set of the processor unit $PE_r$, and cycling of the processor unit $PE_r$.

7. The method according to claim 1, wherein the service state $Z_{MPS,r}$ considers one or more of the following parameters:

a current physical configuration of the robot ROBO, a dynamic state of the robot ROBO, an electric state of the robot ROBO, and an interaction or interactions of the robot ROBO with an environment.

8. The method according to claim 1, wherein the error state is additionally defined such that the execution of the current control program SP(t) leads to a:

robot state $Z_{robo}$, to which the following applies: $Z_{robo} \notin Z_{robo,permitted}$, and/or sensor state $Z_{S1,i}$, to which the following applies: $Z_{S1,i} \notin Z_{S1,i,permitted}$, and/or control unit state $Z_{ZSE}$, to which the following applies: $Z_{ZSE} \notin Z_{ZSE,permitted}$, and/or service state $Z_{MPS,r}$, to which the following applies: $Z_{MPS,r} \notin Z_{MPS,r,permitted}$, and/or user interface state $Z_{NS,p}$, to which the following applies: $Z_{NS,p} \notin Z_{NS,p,permitted}$.

9. A robot system comprising the following components:

a robot ROBO with elements configured to be driven by actuators, first sensors $S1_i$, configured to sense a current robot state $Z_{robo}(t)$, where i=1, ..., I, a central control unit ZSE configured to execute a current control program SP(t) for controlling the robot system, one or more user interfaces $NS_p$, where p=1, ..., P, one or more processor units $PE_r$ configured to execute services MPSr for the central control unit ZSE and/or for one or more of the other components of the robot system, where r=1, ..., R, wherein the robot ROBO, the first sensors $S1_i$, the control unit ZSE, the user interfaces $NS_p$, and the processor units $PE_r$ are configured to communicate with one another over a data network DN, wherein the central control unit ZSE and the user interfaces $NS_p$ are configured to modify the current control program SP(t), during the execution thereof at a time $t_1$, to a modified control program SP(t)=SP*(t for $t > t_1$), wherein the robot ROBO is enabled to accept robot states $Z_{robo}$, wherein the following applies: $Z_{robo} \in Z_{robo,total}$ and $Z_{robo,total}$ defines a state space, the state space $Z_{robo,total}$ indicating quantities of all possible robot states, and wherein a state space $Z_{robo,permitted}$ is further specified, the state space $Z_{robo,permitted}$ defining quantities of all permitted robot states $Z_{robo,permitted}$, wherein the following applies: $Z_{robo,permitted} \in Z_{robo,permitted1}$ and $Z_{robo,permitted} \subseteq Z_{robo,total}$, wherein the first sensors $S1_i$ are enabled to accept sensor states $Z_{S1,i}$, wherein the following applies: $Z_{S1,i} \in Z_{S1,i,total}$ and $Z_{S1,i,total}$ defines a state space, the state space $Z_{S1,i,total}$ indicating quantities of all possible sensor states, and wherein a state space $Z_{S1,i,permitted}$ is further specified, the state space $Z_{S1,i,permitted}$ defining quantities of all permitted sensor states $Z_{S1,i,permitted}$, wherein the following applies: $Z_{S1,i,permitted} \in Z_{S1,i,permitted}$ and $Z_{S1,i,permitted} \subseteq Z_{S1,i,total}$, wherein the control unit ZSE is enabled to accept control unit states $Z_{ZSE}$, wherein the following applies: $Z_{ZSE} \in Z_{ZSE,total}$ total and $Z_{ZSE,total}$ defines a state space, the state space $Z_{ZSE,total}$ indicating quantities of all possible control unit states, and wherein a state space $Z_{ZSE,permitted}$ is further specified, the state space $Z_{ZSE,permitted}$ defining quantities of all permitted control unit states $Z_{ZSE,permitted}$, wherein the following applies: $Z_{ZSE,permitted} \in \underline{Z}_{ZSE,permitted}$ and $\underline{Z}_{ZSE,permitted} \subseteq \underline{Z}_{ZSE,total}$, wherein the user interfaces $NS_p$ are enabled to accept user interface states $Z_{NS,p}$, wherein the following applies: $Z_{NS,p} \in \underline{Z}_{NS,p,total}$ and $\underline{Z}_{NS,p,total}$ defines a state space, the state space $\underline{Z}_{NS,p,total}$ indicating quantities of all possible user interface states, and wherein a state space $\underline{Z}_{NS,p,permitted}$ is further specified, the state space $\underline{Z}_{NS,p,permitted}$ defining quantities of all permitted user interface states $Z_{NS,p,permitted}$, wherein the following applies: $Z_{NS,p,permitted} \in \underline{Z}_{NS,p,permitted}$ and $\underline{Z}_{NS,p,permitted} \subseteq \underline{Z}_{NS,p,total}$, wherein the processor units $PE_r$ are enabled to accept processor states $Z_{PE,r}$, wherein the following applies: $Z_{PE,r} \in \underline{Z}_{PE,r,total}$ and $\underline{Z}_{PE,r,total}$ defines a state space, the state space $\underline{Z}_{PE,r,total}$ indicating quantities of all possible processor states, and wherein a state space $\underline{Z}_{PE,r,permitted}$ is further specified, the state space $\underline{Z}_{PE,r,permitted}$ defining quantities of all permitted processor states $Z_{PE,r,permitted}$, wherein the following applies: $Z_{PE,r,permitted} \in \underline{Z}_{PE,r,permitted}$ and $\underline{Z}_{PE,r,permitted} \subseteq \underline{Z}_{PE,r,total}$, where the services $MPS_r$ are enabled to accept service states $Z_{MPS,r}$, wherein the following applies: $Z_{MPS,r} \in \underline{Z}_{MPS,r,total}$ and $\underline{Z}_{MPS,r,total}$ defines a state space, the state space $\underline{Z}_{MPS,r,total}$ indicating quantities of all possible service states, and wherein a state space $\underline{Z}_{MPS,r,permitted}$ is further specified, the state space $\underline{Z}_{MPS,r,permitted}$ defining quantities of all permitted service states $Z_{MPS,r,permitted}$, wherein the following applies: $Z_{MPS,r,permitted} \in \underline{Z}_{MPS,r,permitted}$ and $\underline{Z}_{MPS,r,permitted} \subseteq \underline{Z}_{MPS,r,total}$, and wherein the data network DN is enabled to accept data network states $Z_{data}$, wherein the following applies: $Z_{data} \in \underline{Z}_{data,total}$ and $\underline{Z}_{data,total}$ defines a state space, the state space $\underline{Z}_{data,total}$ indicating quantities of all possible data network states, and wherein a state space $\underline{Z}_{data,permitted}$ further specified, the state space $\underline{Z}_{data,permitted}$ defining quantities of all permitted data network states $Z_{data,permitted}$, wherein the following applies: $Z_{data,permitted} \in \underline{Z}_{data,permitted}$ and $\underline{Z}_{data,permitted} \subseteq \underline{Z}_{data,total}$, wherein the control unit ZSE is executed and configured such that the following operations are executed:

predictively testing, during execution of the current control program SP(t) at a time t, as to whether an execution of the current control program SP(t) yet to be executed at a time $t > t_1$ will lead to an error state, wherein the error state is defined such that the execution of the current control program SP(t) leads to a:

processor state $Z_{PE,r}$, to which the following applies: $Z_{PR,r} \notin \underline{Z}_{PR,r,permitted}$, and/or data network state $Z_{data}(t)$, to which the following applies: $Z_{data} \notin \underline{Z}_{data,permitted}$; and if such an error state is predicted during the predictively testing, executing the following listed actions:

automatically modifying the current control program at a time $t_1$ to the modified control program SP(t)=SP*(t for $t > t_1$) such that no error state is determined with a new predictive test, and executing the modified control program SP(t).

10. The robot system according to claim 9, wherein the state spaces $\underline{Z}_{robo,permitted}$, $\underline{Z}_{S1,i,permitted}$, $\underline{Z}_{ZSE,permitted}$, $\underline{Z}_{PR,r,permitted}$, $\underline{Z}_{MPS,r,permitted}$, $\underline{Z}_{NS,p,permitted}$, $\underline{Z}_{data,permitted}$ permitted are defined as a function of a task/action intended to be executed by the robot ROBO using the control program SP(t).

11. The robot system according to claim 9, wherein the control program SP(t) recognizes its own structure and is enabled to modify it.

12. The robot system according to claim 9, wherein the data network state $Z_{data}$ considers one or more of the following parameters:
- a physical availability of the components: robot ROBO, first sensors $S1_i$, central control unit ZSE, user interfaces $NS_p$, and processor units $PE_r$ in the data network DN,
- a current communication state of the components,
- data and signal runtimes between the components, and
- chronological and causal limitations of a data exchange between the components.

13. The robot system according to claim 9, wherein the robot state $Z_{robo}$ considers one or more of the following parameters:
- a current physical configuration of the robot ROBO,
- a dynamic state of the robot ROBO,
- an electric state of the robot ROBO, and
- an interaction or interactions of the robot ROBO with an environment.

14. The robot system according to claim 9, wherein a processor state $Z_{PE,r}$ considers one or more of the following parameters:
- service or algorithm currently being executed on a processor unit $PE_r$,
- current performance of the service or algorithm being executed on the processor unit $PE_r$,
- available processor capacity of the processor unit $PE_r$,
- current load of the processor unit $PE_r$,
- available working memory of the processor unit $PE_r$,
- state of the control bus of the respective processor unit $PE_r$,
- architecture of the processor unit $PE_r$,
- command set of the processor unit $PE_r$, and
- cycling of the processor unit $PE_r$.

15. The robot system according to claim 9, wherein the service state $Z_{MPS,r}$ considers one or more of the following parameters:
- a current physical configuration of the robot ROBO,
- a dynamic state of the robot ROBO,
- an electric state of the robot ROBO, and
- an interaction or interactions of the robot ROBO with an environment.

16. The robot system according to claim 9, wherein the error state is additionally defined such that the execution of the current control program SP(t) leads to a:

robot state $Z_{robo}$, to which the following applies: $Z_{robo} \notin \underline{Z}_{robo,permitted}$, and/or sensor state to which the following applies: $Z_{S1,i} \notin \underline{Z}_{S1,i,permitted}$, and/or control unit state $Z_{ZSE}$, to which the following applies: $Z_{ZSE} \notin \underline{Z}_{ZSE,permitted}$, and/or service state $Z_{MPS,r}$, to which the following applies: $Z_{MPS,r} \notin \underline{Z}_{MPS,r,permitted}$, and/or user interface state $Z_{NS,p}$, to which the following applies: $Z_{NS,p} \notin \underline{Z}_{NS,p,permitted}$.

17. A method of controlling a robot system, wherein the robot system comprises the following components:
- a robot ROBO with elements configured to be driven by actuators,
- first sensors $S1_i$, configured to sense a current robot state $Z_{robo}(t)$, where i=1, ..., I, a central control unit ZSE configured to execute a current control program SP(t) for controlling the robot system,
one or more user interfaces $NS_p$, where p=1, . . . , P,
one or more processor units $PE_r$ configured to execute services $MPS_r$ for the central control unit ZSE and/or for one or more of the other components of the robot system, where r=1, . . . , R,
wherein the robot ROBO, the first sensors $S1_i$, the control unit ZSE, the user interfaces $NS_p$, and the processor units $PE_r$ are configured to communicate with one another over a data network DN,
wherein the central control unit ZSE and the user interfaces $NS_p$ are configured to modify the current control program SP(t), during the execution thereof at a time $t_1$, to a modified control program SP(t)=SP*(t for t>$t_1$),
wherein the processor units $PE_r$ are enabled to accept processor states $Z_{PE,r}$, wherein the following applies: $Z_{PE,r} \in \underline{Z}_{PE,r,total}$ and $\underline{Z}_{PE,r,total}$ defines a state space, the state space $\underline{Z}_{PE,r,total}$ indicating quantities of all possible processor states, and wherein a state space $\underline{Z}_{PE,r,permitted}$ is further specified, the state space $\underline{Z}_{PE,r,permitted}$ defining quantities of all permitted processor states $Z_{PE,r,permitted}$, wherein the following applies: $Z_{PE,r,permitted} \in \underline{Z}_{PE,r,permitted}$ and $\underline{Z}_{PE,r,permitted} \subseteq \underline{Z}_{PE,r,total}$,
wherein the data network DN is enabled to accept data network states $Z_{data}$, wherein the following applies: $Z_{data} \in \underline{Z}_{data,total}$ and $\underline{Z}_{data,total}$ defines a state space, the state space $\underline{Z}_{data,total}$ indicating quantities of all possible data network states, and wherein a state space $\underline{Z}_{data,permitted}$ further specified, the state space $\underline{Z}_{data,permitted}$ defining quantities of all permitted data network states $Z_{data,permitted}$, wherein the following applies: $Z_{data,permitted} \in \underline{Z}_{data,permitted}$ and $\underline{Z}_{data,permitted} \subseteq \underline{Z}_{data,total}$,
wherein the method comprises:
predictively testing, during execution of the current control program SP(t) at a time t, as to whether an execution of the current control program SP(t) yet to be executed at a time t>$t_1$ will lead to an error state, wherein the error state is defined such that the execution of the current control program SP(t) leads to a:
processor state $Z_{PE,r}$, to which the following applies: $Z_{PR,r} \notin \underline{Z}_{PR,r,permitted}$, and/or
data network state $Z_{data}$(t), to which the following applies: $Z_{data} \notin \underline{Z}_{data,permitted}$; and
if such an error state is predicted during the predictively testing, executing the following listed actions:
automatically modifying the current control program at a time $t_1$ to the modified control program SP(t)=SP*(t for t>$t_1$) such that no error state is determined with a new predictive test, and
executing the modified control program SP(t).

18. The method according to claim 17, wherein the state spaces $\underline{Z}_{PR,r,permitted}$ and $\underline{Z}_{data,permitted}$ are defined as a function of a task/action intended to be executed by the robot ROBO using the control program SP(t).

19. The method according to claim 17, wherein the control program SP(t) recognizes its own structure and is enabled to modify it.

20. The method according to claim 17, wherein the data network state $Z_{data}$ considers one or more of the following parameters:
a physical availability of the components: robot ROBO, first sensors $S1_i$, central control unit ZSE, user interfaces $NS_p$, and processor units $PE_r$ in the data network DN,
a current communication state of the components,
data and signal runtimes between the components, and
chronological and causal limitations of a data exchange between the components.

21. The method according to claim 17, wherein a processor state $Z_{PE,r}$ considers one or more of the following parameters:
service or algorithm currently being executed on a processor unit $PE_r$,
current performance of the service or algorithm being executed on the processor unit $PE_r$,
available processor capacity of the processor unit $PE_r$,
current load of the processor unit $PE_r$,
available working memory of the processor unit $PE_r$,
state of the control bus of the respective processor unit $PE_r$,
architecture of the processor unit $PE_r$,
command set of the processor unit $PE_r$, and
cycling of the processor unit $PE_r$.

* * * * *